United States Patent
Poulain et al.

(10) Patent No.: US 12,081,364 B2
(45) Date of Patent: Sep. 3, 2024

(54) AVIONICS NETWORK HAVING SYNCHRONIZATION DOMAINS, AND METHOD FOR SYNCHRONIZING NETWORK SUBSCRIBERS IN AN AVIONICS NETWORK

(71) Applicant: Airbus Operations GmbH, Hamburg (DE)

(72) Inventors: Stéphane Poulain, Hamburg (DE); Hartmut Hintze, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 17/606,834

(22) PCT Filed: Sep. 24, 2020

(86) PCT No.: PCT/EP2020/076646
§ 371 (c)(1),
(2) Date: Oct. 27, 2021

(87) PCT Pub. No.: WO2021/063785
PCT Pub. Date: Apr. 8, 2021

(65) Prior Publication Data
US 2022/0217011 A1 Jul. 7, 2022

(30) Foreign Application Priority Data
Sep. 30, 2019 (DE) .................. 102019215058.6

(51) Int. Cl.
*H04L 12/403* (2006.01)
*G08G 5/00* (2006.01)
*H04L 12/40* (2006.01)

(52) U.S. Cl.
CPC ......... *H04L 12/403* (2013.01); *G08G 5/0004* (2013.01); *H04L 12/40* (2013.01); *H04L 2012/4028* (2013.01)

(58) Field of Classification Search
None
See application file for complete search history.

(56) References Cited

U.S. PATENT DOCUMENTS

| | | | |
|---|---|---|---|
| 8,543,263 B2 * | 9/2013 | Danielsson | H04L 69/28 701/3 |
| 9,882,667 B2 | 1/2018 | Hartlmueller et al. | |

(Continued)

FOREIGN PATENT DOCUMENTS

| | | |
|---|---|---|
| DE | 102005034944 B3 | 11/2006 |
| DE | 102010049534 A1 | 6/2011 |

(Continued)

OTHER PUBLICATIONS

International Search Report and Written Opinion; priority document.

*Primary Examiner* — Liem H. Nguyen
(74) *Attorney, Agent, or Firm* — Greer, Burns & Crain, Ltd.

(57) ABSTRACT

An avionics network comprises at least one data bus system, a multiplicity of network subscribers connected to one or more of the data bus systems via network interfaces, a central configuration server configured to configure each of the multiplicity of network subscribers individually according to a predefined functionality, and a synchronization note configured to stipulate a work-cycle for the multiplicity of network subscribers via the at least one data bus system according to a stipulated synchronization protocol.

8 Claims, 2 Drawing Sheets

(56) References Cited

U.S. PATENT DOCUMENTS

| | | | |
|---|---|---|---|
| 10,270,567 B1* | 4/2019 | Rang | H04L 5/0044 |
| 10,931,480 B1* | 2/2021 | Waldersen | H04L 67/565 |
| 2006/0203851 A1* | 9/2006 | Eidson | H04J 3/085 |
| | | | 370/503 |
| 2007/0094528 A1* | 4/2007 | Fredriksson | H04L 12/40026 |
| | | | 713/375 |
| 2007/0115938 A1* | 5/2007 | Conzachi | B64F 5/60 |
| | | | 370/352 |
| 2008/0187282 A1* | 8/2008 | Brady | H04L 65/80 |
| | | | 386/E5.07 |
| 2009/0118874 A1* | 5/2009 | White | H02J 4/00 |
| | | | 244/58 |
| 2009/0125656 A1 | 5/2009 | Haas et al. | |
| 2009/0275276 A1* | 11/2009 | Casado Montero | B64D 13/06 |
| | | | 454/75 |
| 2009/0323704 A1* | 12/2009 | Hall | H04L 12/4625 |
| | | | 370/401 |
| 2011/0153889 A1 | 6/2011 | Barrenscheen | |
| 2011/0240798 A1* | 10/2011 | Gershzohn | G08B 17/00 |
| | | | 244/129.2 |
| 2012/0207183 A1 | 8/2012 | Bobrek et al. | |
| 2013/0283174 A1* | 10/2013 | Faridian | H04L 41/22 |
| | | | 709/224 |
| 2015/0106473 A1* | 4/2015 | Bobrek | H04L 69/08 |
| | | | 709/217 |
| 2016/0094674 A1* | 3/2016 | Drion | H04B 7/18506 |
| | | | 709/217 |
| 2016/0308751 A1* | 10/2016 | Rang | H04L 49/351 |
| 2017/0019479 A1* | 1/2017 | Rangarajan | H04L 12/40169 |
| 2017/0149518 A1* | 5/2017 | Hartlmueller | H04L 12/40032 |
| 2017/0310748 A1* | 10/2017 | Cote | H04L 63/02 |
| 2018/0290729 A1* | 10/2018 | Shavit | G08G 5/0056 |
| 2019/0155995 A1* | 5/2019 | Bangole | H04W 12/041 |
| 2020/0267046 A1* | 8/2020 | Rayrole | H04L 67/1095 |
| 2021/0354846 A1* | 11/2021 | Liu | B64D 1/02 |
| 2021/0367810 A1* | 11/2021 | Hartwich | H04L 12/4013 |
| 2023/0093337 A1* | 3/2023 | Abdelhameed | H04J 3/0667 |

FOREIGN PATENT DOCUMENTS

| | | |
|---|---|---|
| DE | 102012023395 A1 | 6/2014 |
| DE | 102016101181 B3 | 3/2017 |
| DE | 102017223775 A1 | 6/2019 |

* cited by examiner

AVIONICS NETWORK HAVING SYNCHRONIZATION DOMAINS, AND METHOD FOR SYNCHRONIZING NETWORK SUBSCRIBERS IN AN AVIONICS NETWORK

CROSS-REFERENCES TO RELATED APPLICATIONS

This application claims the benefit of the International Application No. PCT/EP2020/076646, filed on Sep. 24, 2020, and of the German patent application No. 102019215058.6 filed on Sep. 30, 2019, the entire disclosures of which are incorporated herein by way of reference.

FIELD OF THE INVENTION

The invention relates to an avionics network, i.e., a data network for use in avionics applications, which has synchronization domains for the autonomization of network components, and a method for synchronizing network components in an avionics network.

BACKGROUND OF THE INVENTION

In highly complex environments in which a multiplicity of applications or processes are to be performed reliably and in a short period of time, particularly in air travel and space travel, networks of individual network components are frequently used which exchange data with one another. In air travel and space travel, fast processing time is usually required, so that all connected systems can function reliably under real-time conditions. It is simultaneously desirable to keep the high data throughput through networks of this type as low as possible.

Document US 2012/0207183 A1 discloses a method for synchronizing a local estimation for the timing of a network-wide operating cycle. Document DE 10 2012 023 395 A1 discloses a distributed real-time system with an interface apparatus for exchanging time-critical data.

SUMMARY OF THE INVENTION

One of the objects of the invention is to find improved solutions for the implementation of avionics networks with autonomously acting network nodes.

According to a first aspect of the invention, an avionics network comprises at least one data bus system, a multiplicity of network components which are connected via network interfaces to one or more of the data bus systems, a central configuration server which is designed to configure each of the multiplicity of network components individually according to a predefined functionality, and a synchronization node which is designed to stipulate an operating cycle of the multiplicity of network components according to a stipulated synchronization protocol via the at least one data bus system.

According to a second aspect of the invention, an aircraft comprises an avionics network according to the first aspect of the invention, and a gateway which is designed to connect the avionics network to other networks on board the aircraft.

According to a third aspect of the invention, a method for synchronizing network components in an avionics network comprises the steps of connecting a multiplicity of network components via network interfaces to one or more data bus systems, configuring each of the multiplicity of network components individually according to a predefined functionality by means of a central configuration server, and stipulating an operating cycle of the multiplicity of network components according to a stipulated synchronization protocol via the at least one data bus system by means of a synchronization node.

One particular advantage of the solutions according to the invention is that local functions can be decoupled from the rest of the aircraft and can be processed autonomously or semi-autonomously. As a result, shared resources in the aircraft can be used as efficiently as possible and with a minimal load. The latency of operational tasks which are to be performed locally can advantageously be reduced. Activation and deactivation signals can be transmitted by the crew or other users via the network for a targeted control of the individual network components. Different network components can be operated in a concerted manner through the common synchronization, such as, for example, the coordinated setting of lighting scenarios, the targeted control of individual robots on board the aircraft, or the coordinated presentation of content on different separate display units.

According to some embodiments of the avionics network, the avionics network can further have a multiplicity of aircraft components to be controlled which are connected in each case to one or more of the multiplicity of network components via a control interface, wherein the multiplicity of network components are designed to control the connected aircraft components autonomously from the remaining network components.

According to some further embodiments of the avionics network, the multiplicity of network components in each case have a processor whose configuration can be stipulated by the central configuration server according to the desired functionality of the connected aircraft components.

According to some further embodiments of the avionics network, a first group of the multiplicity of network components can be assigned to a first synchronization domain, and a second group of the multiplicity of network components can be assigned to a second synchronization domain.

According to some further embodiments of the avionics network, the first synchronization domain can operate according to a first operating cycle derived from the stipulated synchronization protocol, the second synchronization domain can operate according to a second operating cycle derived from the stipulated synchronization protocol, and the first and second operating cycles can differ from one another.

According to some further embodiments of the avionics network, one or more of the multiplicity of network components can have a wireless communication module via which the network component can communicate wirelessly with an aircraft component.

According to some embodiments of the method, a first group of the multiplicity of network components can be assigned to a first synchronization domain, and a second group of the multiplicity of network components can be assigned to a second synchronization domain.

According to some further embodiments of the method, the first synchronization domain can operate according to a first operating cycle derived from the stipulated synchronization protocol, the second synchronization domain can operate according to a second operating cycle derived from the stipulated synchronization protocol, and the first and second operating cycles can differ from one another.

The above designs and developments can be combined with one another in any manner insofar as appropriate. Further possible designs, developments and implementations of the invention also comprise combinations, not explicitly mentioned, of features of the invention described above or below in relation to the example embodiments. In particular, those skilled in the art will also add individual aspects as improvements or complements to the respective basic form of the present invention.

BRIEF DESCRIPTION OF THE DRAWINGS

The present invention is explained in detail below with reference to the example embodiments indicated in the schematic figures, wherein.

Figure 1:
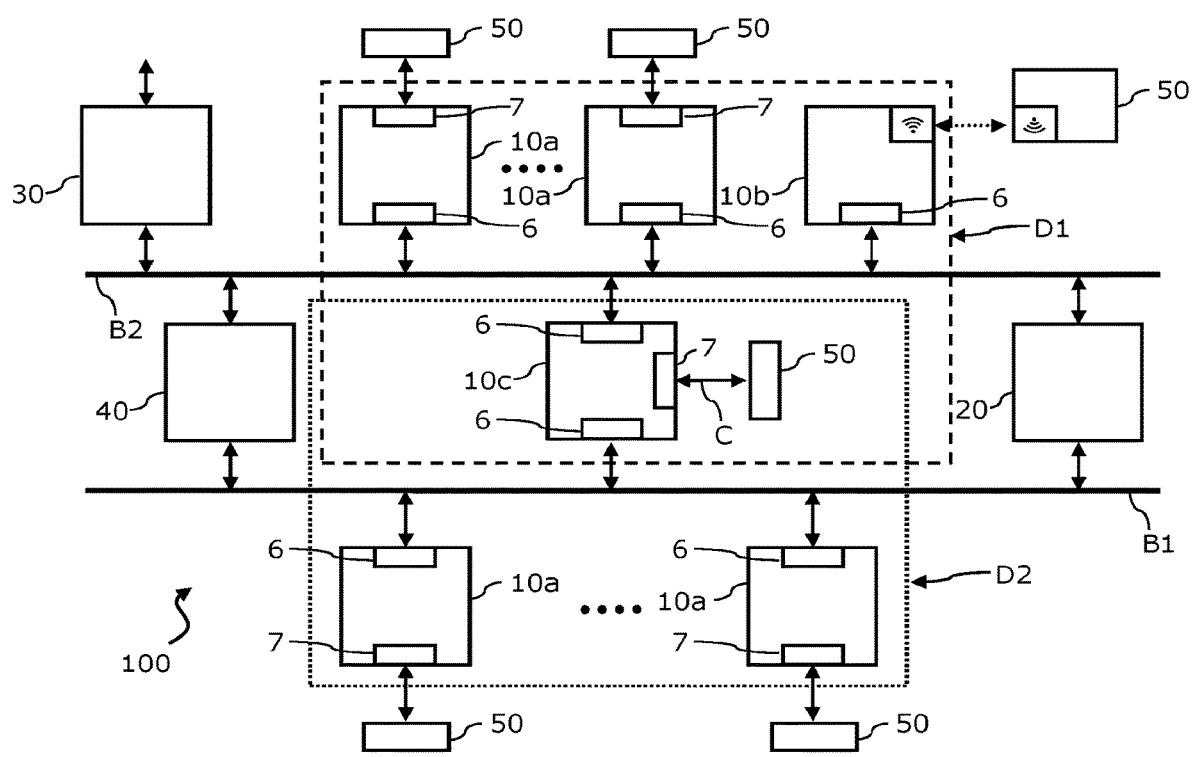
FIG. 1 shows a schematic block diagram of an avionics network according to one embodiment of the invention.

The attached figures are intended to convey a further understanding of the embodiments of the invention. They illustrate embodiments and serve in connection with the description to explain principles and concepts of the invention. Other example embodiments and many of the aforementioned advantages can be found in the drawings. The elements of the drawings are not necessarily shown true-to-scale in relation to one another. Direction-indicating terminology such as "above", "below", "left", "right", "over", "under", "horizontal", "vertical", "in front", "behind" and similar indications are used merely for explanatory purposes and do not serve to restrict the generality to specific designs as shown in the figures.

Unless otherwise stated, similar, functionally similar and similarly acting elements, features and components are denoted in each case with the same reference numbers in the figures of the drawing.

DETAILED DESCRIPTION OF THE PREFERRED EMBODIMENTS

Reference is made in the following description to avionics networks. "Avionics networks" within the meaning of the present description comprise any type of networks in which networked electronic components, in particular electrical and electronic devices on board an aircraft, including the electronic flight instruments, can exchange data relevant to avionics applications with one another via a common data exchange protocol. Networked electronic components of this type can comprise, for example, flight control and management systems, flight control systems, flight monitoring devices, collision warning systems, intercommunication systems, flight radio systems, navigation systems, instrument landing systems, global navigation satellite systems, inertial navigation systems, sensor system, radar system and any type of cabin and cargo modules, such as, for example, galley components, stowage compartment components, intelligent light and display devices, seat operating devices, sanitary area controls, on-board entertainment systems and the like.

Figure 2:
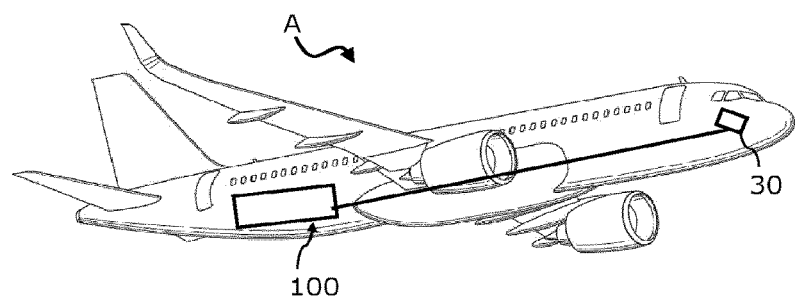
FIG. 2 shows an illustration of an aircraft having an avionics network as shown in FIG. 1 according to one embodiment of the invention.

FIG. 1 shows an example of a schematic illustration of an avionics network 100 in the form of a block diagram. The avionics network 100 can be used, for example, in an aircraft, such as, for example, an aircraft A shown by way of example in FIG. 2. The avionics network 100 can be connected to other networks in the aircraft A via a gateway 30 on board the aircraft A.

Figure 3:
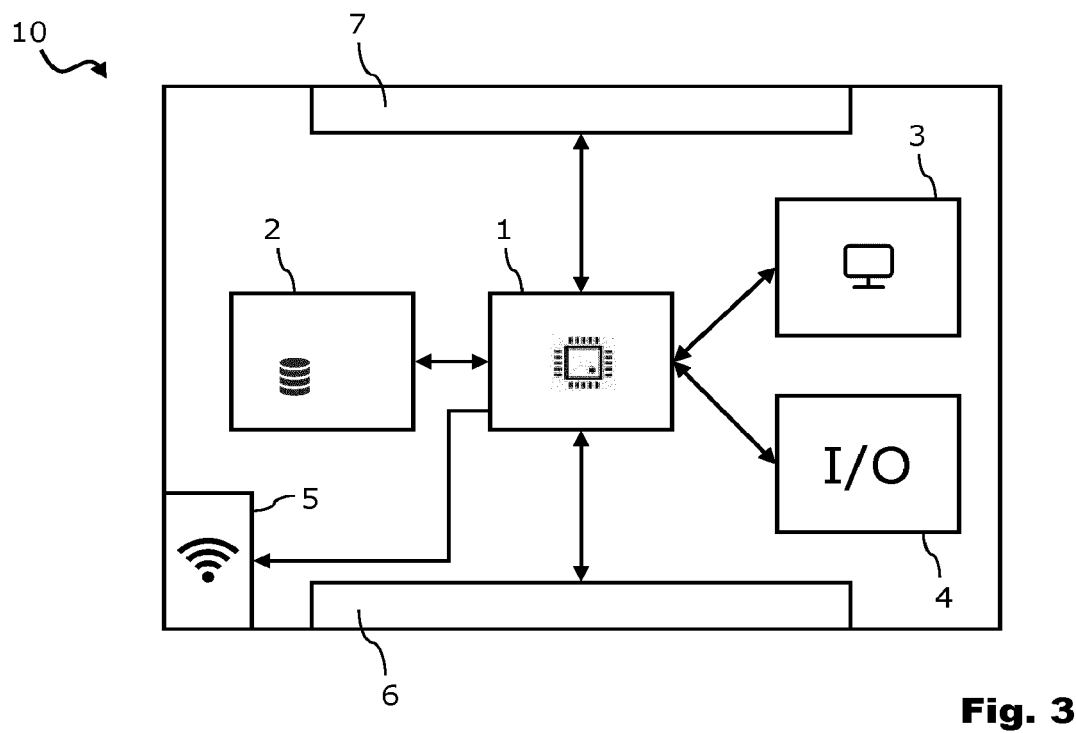
FIG. 3 shows a schematic block diagram of a network component of an avionics network as shown in FIG. 1 according to one embodiment of the invention.

The avionics network 100 has a number of network components 10a, 10b, 10c, the basic structure of which is explained in connection with FIG. 3. FIG. 3 shows a schematic block diagram of a network component 10 of an avionics network 100 shown in FIG. 1. The reference number 10 is used for the sake of clarity in connection with FIG. 3, wherein it should be obvious that each of the network components 10a, 10b, 10c shown by way of example in FIG. 1 can have one or more of the features of the network component 10 explained in FIG. 3.

The avionics network 100 has one or more data bus systems, of which two data bus systems B1, B2 are shown explicitly by way of example in FIG. 1. It should be obvious that more or fewer than two data bus systems B1, B2 can also be used in the avionics network 100. As shown, the data bus systems B1, B2 can be wired systems, such as, for example, AFDX, ARINC 429, ARINC 629, ARINC 717, CAN bus, MIL-STD-1553 or TTP. Alternatively or additionally thereto, it may also be possible to interconnect one or more of the network components 10a, 10b, 10c wirelessly, for example via ZigBee, WLAN, WiFi, WiMax, or in a different wireless network.

The network components 10a, 10b, 10c in each case have one or more network interfaces 6 via which they are connected to one another and/or to one or more of the data bus systems B1, B2. The network components 10a, 10b, 10c further have control interfaces 7 to which components 50 which are to be controlled by the respective network components 10a, 10b, 10c can be connected on board an aircraft, such as, for example, the aircraft A. The network components 10a, 10b, 10c can be configured accordingly to carry out an autonomous, partially autonomous or synchronized control of the respectively connected components 50. The components 50 can comprise any type of electrical or electronic units which are to be controlled on board an aircraft, such as light modules, lights, display devices, galley modules, seat-operating elements or the like. The connected aircraft components 50 can be controlled by one or more respectively assigned network components autonomously from the remaining network components.

The avionics network 100 has a central configuration server 40 which is designed to configure each of the multiplicity of network components 10a, 10b, 10c individually according to a predefined functionality. For this purpose, the central configuration server 40 can achieve an implementation of redundant functions in the avionics network 100. A desired function can be distributed among many network components. The network components can further provide resources as services amongst themselves.

It may be appropriate, for example, to assign the same functions to different network components. As a result, the reliability of a function can be improved if a further instance of the same function is retained. An installation of the same function can further be undertaken in order to ensure a specific quality of service, such as, for example, data throughput or maximum latency. Redundant function configurations can also be used for load balancing during the optimization of the resource usage. A duplication of a function can also simplify a flight operation by enabling the fully autonomous operation of an aircraft zone, such as, for example, the management of a group of components, such as cabin modules in the passenger area.

The avionics network 100 further comprises a synchronization node which is designed to stipulate an operating cycle of the multiplicity of network components 10a, 10b, 10c according to a stipulated synchronization protocol via the at least one data bus system B1, B2. The Network Time Protocol (NTP), the Precision Time Protocol (PTP) or other synchronization protocols can be accessed for this purpose.

As illustrated in connection with FIG. 3, the network components 10 can have a processor 1 whose configuration can be stipulated by the central configuration server 40 according to the desired functionality of the connected aircraft components 50. The network components 10 can further have a wireless communication module 5 via which the network component 10 can communicate wirelessly with an aircraft component 50. Each network component 10 can further optionally have input/output devices 4 and display devices 3 for operation by a user. The number of network interfaces 6 and control interfaces 7 is shown only by way of example as one, so that more than one network interface 6 or control interface 7 can also be provided in each case depending on the number of network connections or aircraft components to be controlled.

The configuration of the processor 1 can be stored in a configuration memory 2 of the network component 10 which can be operationally connected to the processor 1. The services for the processor are implemented in software which can be called and executed according to a software development kit (SDK) with a common metadata standard (dictionary).

As shown in FIG. 1, a first group of the multiplicity of network components can be assigned to a first synchronization domain D1. A second group of the multiplicity of network components can be assigned to a second synchronization domain D2. The first synchronization domain D1 and the second synchronization domain D2 can overlap, i.e., can have one or more network components in common, or can be disjoint, i.e., completely separated from one another.

The first synchronization domain D1 operates according to a first operating cycle derived from the stipulated synchronization protocol, whereas the second synchronization domain D2 operates according to a second operating cycle derived from the stipulated synchronization protocol. The first and second operating cycles are in each case different from one another. For safety-critical aircraft components 50, for example, such as, for example, flight control systems, a faster or higher operating cycle can be chosen than for non-safety-critical aircraft components 50, such as, for example, lighting elements. With a faster operating cycle, the data throughput and therefore the required bandwidth increase in favor of a faster response time in response to changing operational circumstances. The network components assigned to the safety-critical aircraft components 50, for example, can access flight status data from avionics systems of the aircraft A connected via the gateway 30 in order to be able to adapt the respective avionics context of their operating situation.

Figure 4:
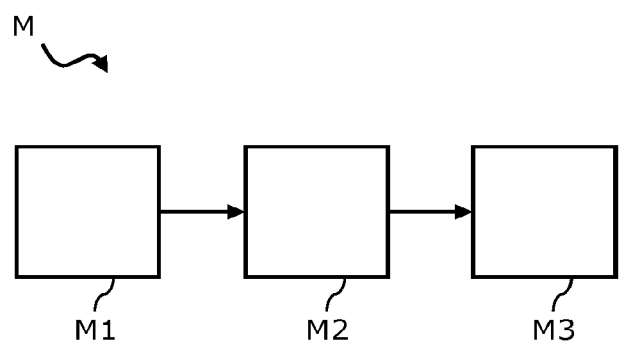
FIG. 4 shows a flow diagram of a method for synchronizing network components in an avionics network according to a further embodiment of the invention.

FIG. 4 shows a method M for synchronizing network participants in an avionics network. The method M can be applied, for example, in an avionics network 100 as shown in FIG. 1. The method M can be implemented using the components, explained in connection with FIG. 1, of an avionics network 100 to synchronize network participants 10.

As a first step M1, the method M comprises connecting a multiplicity of network components 10a; 10b; 10c via network interfaces 6 to one or more data bus systems B1; B2. In a second step M2, each of the multiplicity of network components 10a; 10b; 10c is configured individually according to a predefined functionality by a central configuration server 40. Finally, in a step M3, an operating cycle of the multiplicity of network components 10a; 10b; 10c is stipulated according to a stipulated synchronization protocol via the at least one data bus system B1; B2 by a synchronization node 20.

A first group of the multiplicity of network components 10a; 10b; 10c can be assigned to a first synchronization domain D1. A second group of the multiplicity of network components 10a; 10b; 10c can be assigned to a second synchronization domain D2. The first synchronization domain D1 operates according to a first operating cycle derived from the stipulated synchronization protocol, and the second synchronization domain D2 operates according to a second operating cycle derived from the stipulated synchronization protocol. The first synchronization domain D1 and the second synchronization domain D2 can overlap, i.e., can have one or more network components in common, or can be disjoint, i.e., completely separated from one another.

The first synchronization domain D1 operates according to a first operating cycle derived from the stipulated synchronization protocol, whereas the second synchronization domain D2 operates according to a second operating cycle derived from the stipulated synchronization protocol. The first and second operating cycles are in each case different from one another. For safety-critical aircraft components 50, for example, such as, for example, flight control systems, a faster or higher operating cycle can be chosen than for non-safety-critical aircraft components 50, such as, for example, lighting elements. With a faster operating cycle, the data throughput and therefore the required bandwidth increase in favor of a faster response time in response to changing operational circumstances. The network components assigned to the safety-critical aircraft components 50, for example, can access flight status data from avionics systems of the aircraft A connected via the gateway 30 in order to be able to adapt the respective avionics context of their operating situation.

In the preceding detailed description, different features have been combined in one or more examples to improve the rigor of the presentation. However, it should be obvious that the above description is merely of an illustrative, but in no way limiting, nature. It serves to cover all alternatives, modifications and equivalents of the different features and example embodiments. Many other examples will be immediately and directly obvious to those skilled in the art on the basis of their technical knowledge in light of the above description.

The example embodiments have been selected and described in order to be able to illustrate in the best possible manner the principles underlying the invention and their possible applications in practice. Persons skilled in the art can thereby optimally modify and use the invention and its different example embodiments in relation to the intended use. In the claims and the description, the terms "containing" and "having" are used as linguistically neutral concepts for the corresponding term "comprising". Furthermore, the use of the terms "one" and "a" is not essentially intended to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An avionics network, comprising:
   at least one data bus system;
   a multiplicity of network components which are connected via network interfaces to one or more of the at least one data bus system;
   a central configuration server which is configured to configure each of the multiplicity of network components individually according to a predefined functionality, and wherein at least two network components of the multiplicity of the network components are configured according to the same predefined functionality; and
   a synchronization node which is configured to stipulate an operating cycle of the multiplicity of network components according to a stipulated synchronization protocol via the at least one data bus system,
   wherein a first group of the multiplicity of network components is assigned to a first synchronization domain, and a second group of the multiplicity of network components is assigned to a second synchronization domain, and
   wherein at least one network component is assigned simultaneously to both the first synchronization domain and the second synchronization domain.

2. The avionics network as claimed in claim 1, further having:
   a multiplicity of aircraft components to be controlled which are each connected to one or more of the multiplicity of network components via a control interface,
   wherein the multiplicity of network components are configured to control the connected aircraft components autonomously from remaining network components.

3. The avionics network as claimed in claim 2, wherein the multiplicity of network components each have a processor whose configuration can be stipulated by the central configuration server according to a desired functionality of the connected aircraft components.

4. The avionics network as claimed in claim 1, wherein the first synchronization domain operates according to a first operating cycle derived from the stipulated synchronization protocol, the second synchronization domain operates according to a second operating cycle derived from the stipulated synchronization protocol, and the first and second operating cycles differ from one another.

5. The avionics network as claimed in claim 1, wherein one or more network components of the multiplicity of network components has a wireless communication module via which the network component can communicate wirelessly with an aircraft component.

6. An aircraft having an avionics network as claimed in claim 1 and a gateway which is configured to connect the avionics network to other networks on board the aircraft.

7. A method for synchronizing network components in an avionics network, comprising:
   connecting a multiplicity of network components via network interfaces to one or more data bus systems;
   configuring each of the multiplicity of network components individually according to a predefined functionality by means of a central configuration server and wherein at least two network components of the multiplicity of the network components are configured according to the same predefined functionality; and
   stipulating an operating cycle of the multiplicity of network components according to a stipulated synchronization protocol via the one or more data bus systems by means of a synchronization node,
   wherein a first group of the multiplicity of network components is assigned to a first synchronization domain, and a second group of the multiplicity of network components is assigned to a second synchronization domain, and
   wherein at least one network component is assigned simultaneously to both the first synchronization domain and the second synchronization domain.

8. The method as claimed in claim 7, wherein the first synchronization domain operates according to a first operating cycle derived from the stipulated synchronization protocol, the second synchronization domain operates according to a second operating cycle derived from the stipulated synchronization protocol, and the first and second operating cycles differ from one another.

* * * * *